US011221248B2

(12) United States Patent
Lee et al.

(10) Patent No.: US 11,221,248 B2
(45) Date of Patent: *Jan. 11, 2022

(54) PUMP HEAD AND METERING DEVICE

(71) Applicant: F. Holzer GmbH, St. Ingbert (DE)

(72) Inventors: Hyek Hee Lee, St. Ingbert (DE); Ute Steinfeld, St. Ingbert (DE); Markus Mahler, Völklingen (DE); Frank Holzer, St. Ingbert (DE)

(73) Assignee: F. Holzer GmbH, St. Ingbert (DE)

( * ) Notice: Subject to any disclaimer, the term of this patent is extended or adjusted under 35 U.S.C. 154(b) by 86 days.

This patent is subject to a terminal disclaimer.

(21) Appl. No.: 16/315,364

(22) PCT Filed: Jun. 1, 2017

(86) PCT No.: PCT/EP2017/063346
§ 371 (c)(1),
(2) Date: Jan. 4, 2019

(87) PCT Pub. No.: WO2018/010890
PCT Pub. Date: Jan. 18, 2018

(65) Prior Publication Data
US 2019/0212179 A1    Jul. 11, 2019

(30) Foreign Application Priority Data

Jul. 14, 2016  (DE) ..................... 10 2016 212 892.2

(51) Int. Cl.
*G01F 15/00*   (2006.01)
*B05B 11/00*   (2006.01)
(Continued)

(52) U.S. Cl.
CPC .......... *G01F 15/005* (2013.01); *B05B 11/007* (2013.01); *B05B 11/0067* (2013.01);
(Continued)

(58) Field of Classification Search
CPC combination set(s) only.
See application file for complete search history.

(56) References Cited

U.S. PATENT DOCUMENTS 1,592,402 A * 7/1926 Wilcox, Jr. ............ B65D 35/20
222/496
1,621,097 A * 3/1927 Zammataro ............ B65D 35/20
222/496
(Continued)

FOREIGN PATENT DOCUMENTS

| CN | 101542242 A | 9/2009 |
|----|-------------|--------|
| CN | 103168215 A | 6/2013 |

(Continued)

OTHER PUBLICATIONS

Peng, Min, "Parametric Design of Axial Flow Pump and Analysis of Stress and Modal Characteristics", Chinese Journal of Computational Mechanics, Issue 1, vol. 33, Feb. 29, 2016, 122-126 (Year: 2016).*

(Continued)

*Primary Examiner* — Patrick M. Buechner
(74) *Attorney, Agent, or Firm* — Schwegman Lundberg & Woessner, P.A.

(57) ABSTRACT

Disclosed is a pump head with a specially configured elastic valve which enables secure closure of the pump head. It is ensured by the valve that complete emptying and, at the same time, secure closing of the pump head is ensured so that no residues of fluid to be metered remain in the storage state of the pump head. In addition, the present invention relates to a metering device which can be configured for example as squeeze bottle, as non-airless system or as airless system, the metering device comprising a pump head according to the invention.

25 Claims, 11 Drawing Sheets

(51) Int. Cl.
*B05B 11/04* (2006.01)
*G01F 11/04* (2006.01)
*G01F 11/08* (2006.01)
*B65D 47/20* (2006.01)

(52) U.S. Cl.
CPC .......... *B05B 11/047* (2013.01); *B05B 11/048* (2013.01); *B65D 47/2068* (2013.01); *G01F 11/04* (2013.01); *G01F 11/082* (2013.01); *B05B 11/3016* (2013.01)

(56) References Cited

U.S. PATENT DOCUMENTS

| | | | | |
|---|---|---|---|---|
| 2,015,794 A * | 10/1935 | Gray | ................... | B65D 35/20 222/496 |
| 2,026,234 A * | 12/1935 | Knuutila | ............. | B05B 11/3011 222/255 |
| 2,270,794 A * | 1/1942 | Feldmar | ................. | B65D 35/20 222/496 |
| 2,936,935 A * | 5/1960 | Rabb | .................... | B65D 47/247 222/525 |
| 3,008,611 A * | 11/1961 | Mancusi, Jr. | ...... | B65D 47/2068 222/207 |
| 3,401,719 A | 9/1968 | Rosser | | |
| 3,746,261 A | 7/1973 | Nozawa et al. | | |
| 3,759,425 A | 9/1973 | Lee | | |
| 4,102,476 A * | 7/1978 | Loeffler | ................ | B05B 11/046 222/209 |
| 4,420,101 A * | 12/1983 | O'Neill | ................ | B05B 11/047 137/493 |
| 4,739,906 A * | 4/1988 | LoTurco | ............... | A61J 1/1443 222/212 |
| 5,325,999 A * | 7/1994 | Gueret | ................... | B65D 35/20 222/212 |
| 5,819,990 A * | 10/1998 | Cimentepe | .......... | B05B 11/0067 222/207 |
| 6,332,730 B1 * | 12/2001 | Taghavi-Khanghah | ..................... | B65D 35/20 222/212 |
| 6,695,173 B1 * | 2/2004 | Fontana | ............. | B65D 47/2068 222/206 |
| 7,249,694 B2 * | 7/2007 | Masuda | ................. | B65D 35/20 222/496 |
| 8,485,398 B2 * | 7/2013 | Kneer | ................ | B65D 47/2075 222/494 |
| 10,654,629 B2 * | 5/2020 | Murase | ................... | B65D 47/18 |
| 2002/0014499 A1 | 2/2002 | Bonningue | | |
| 2006/0186139 A1 * | 8/2006 | Laidler | .............. | B05B 11/3032 222/207 |
| 2006/0231579 A1 | 10/2006 | Carter | | |
| 2009/0008413 A1 | 1/2009 | Choi et al. | | |
| 2009/0294347 A1 | 12/2009 | Wochele et al. | | |
| 2009/0321479 A1 | 12/2009 | Fontana | | |
| 2011/0068133 A1 * | 3/2011 | Painchaud | ......... | B65D 47/2081 222/494 |
| 2011/0084098 A1 | 4/2011 | Py | | |
| 2011/0089191 A1 * | 4/2011 | Altonen | ................ | B65D 35/20 222/496 |
| 2011/0240677 A1 | 10/2011 | Dwyer | | |
| 2013/0200110 A1 * | 8/2013 | Lee | ................... | B65D 47/2068 222/207 |
| 2014/0231462 A1 | 8/2014 | Ray et al. | | |
| 2018/0229247 A1 * | 8/2018 | Laidler | ............. | B65D 47/2068 222/206 |
| 2018/0236466 A1 * | 8/2018 | Laidler | .............. | B05B 11/3069 222/321.6 |
| 2019/0016509 A1 * | 1/2019 | Bloc | .................... | B05B 11/046 222/209 |
| 2019/0212179 A1 | 7/2019 | Lee et al. | | |
| 2019/0224705 A1 * | 7/2019 | Lee | ................... | B05B 11/3011 222/255 |
| 2019/0283056 A1 | 9/2019 | Ki et al. | | |
| 2019/0283060 A1 | 9/2019 | Ki et al. | | |

FOREIGN PATENT DOCUMENTS

| | | | | |
|---|---|---|---|---|
| CN | 105057139 A | | 11/2015 | |
| DE | 3102346 A1 | | 9/1982 | |
| DE | 10200519 A1 | | 7/2003 | |
| DE | 102009048476 B3 | | 9/2010 | |
| DE | 102014221393 A1 | | 4/2016 | |
| EP | 1084764 A1 | | 3/2001 | |
| EP | 1164362 A1 | | 12/2001 | |
| EP | 2383553 A1 | | 11/2011 | |
| JP | 11240553 A | * | 9/1999 | ......... B65D 47/2068 |
| JP | 2008265802 A | | 11/2008 | |
| WO | WO-9005091 A1 | | 5/1990 | |
| WO | WO-0037179 A1 | | 6/2000 | |

OTHER PUBLICATIONS

Zhang, Xu, "Development on Infusion System of Portable Human Body Automatic Infusion", Microcontrollers & Embedded Systems, Issue 12, (Dec. 31, 2015), 62-65 (Year: 2015).*
"International Application Serial No. PCT/EP2017/063346 International Preliminary Report on Patentability dated Jan. 24, 2019", 9 pgs.
"International Application Serial No. PCT/EP2017/063346, International Search Report dated Aug. 17, 2017", w/ English Translation, (dated Aug. 17, 2017), 9 pgs.
"International Application Serial No. PCT/EP2017/063346, Written Opinion dated Aug. 17, 2017", (dated Aug. 17, 2017), 7 pgs.
"Chinese Application No. 201780043716.1, Office Action dated Jan. 3, 2020", w/ English Translation, (dated Jan. 3, 2020), 21 pgs.
"Chinese Application Serial No. 201780043716.1, Office Action dated Sep. 23, 2020", w/ English Translation, (dated Sep. 23, 2020), 9 pgs.
"Chinese Application Serial No. 201780043716.1, Office Action dated Apr. 9, 2021", w/ English Translation, (dated Apr. 9, 2021), 7 pgs.
"U.S. Appl. No. 16/317,266, Examiner Interview Summary dated Apr. 13, 2021", 2 pgs.
"U.S. Appl. No. 16/317,266, Final Office Action dated Jul. 14, 2020", 8 pgs.
"U.S. Appl. No. 16/317,266, Non Final Office Action dated Jan. 4, 2021", 7 pgs.
"U.S. Appl. No. 16/317,266, Non Final Office Action dated Feb. 20, 2020", 13 pgs.
"U.S. Appl. No. 16/317,266, Preliminary Amendment filed Jan. 11, 2019", 8 pgs.
"U.S. Appl. No. 16/317,266, Response filed May 3, 2021 to Non Final Office Action dated Jan. 4, 2021", 13 pgs.
"U.S. Appl. No. 16/317,266, Response filed May 19, 2020 to Non Final Office Action dated Feb. 20, 2020", 14 pgs.
"U.S. Appl. No. 16/317,266, Response filed Dec. 10, 2019 to Restriction Requirement dated Sep. 10, 2019", 7 pgs.
"U.S. Appl. No. 16/317,266, Response filed Dec. 14, 2020 to Final Office Action dated Jul. 14, 2020", 20 pgs.
"U.S. Appl. No. 16/317,266, Restriction Requirement dated Sep. 10, 2019", 5 pgs.
"Chinese Application Serial No. 201780054341.9, Office Action dated Oct. 29, 2020", w/ English Translation, (dated Oct. 29, 2020), 11 pgs.
"International Application No. PCT/EP2017/063342, International Search Report dated Aug. 10, 2017", (dated Aug. 10, 2017), 3 pgs.
"U.S. Appl. No. 16/317,266, Notice of Allowance dated May 13, 2021", 7 pgs.
"U.S. Appl. No. 16/317,266, Notice of Allowance dated Jul. 6, 2021", 7 pgs.
"Australian Application Serial No. 2017295387, Office Action dated May 14, 2021", (May 14, 2021), 3 pgs.
"Indian Application Serial No. 201917001023, Office Action dated Jun. 7, 2021", (Jun. 7, 2021), 6 pgs.
"International Application No. PCT/EP2017/063342, Written Opinion dated Aug. 10, 2017", (Aug. 10, 2017), 7 pgs.

* cited by examiner

PUMP HEAD AND METERING DEVICE

PRIORITY APPLICATIONS

This application is a U.S. National Stage Filing under 35 U.S.C. 371 from International Application No. PCT/EP2017/063346, filed on Jun. 1, 2017, and published as WO2018/010890 on Jan. 18, 2018, which claims the benefit of priority to German Application No. 10 2016 212 892.2, filed on Jul. 14, 2016; the benefit of priority of each of which is hereby claimed herein, and which applications and publication are hereby incorporated herein by reference in their entirety.

TECHNICAL FIELD

The present invention relates to a pump head with a specially configured elastic valve which enables secure closure of the pump head. It is ensured by the valve that complete emptying and, at the same time, secure closing of the pump head is ensured so that no residues of fluid to be metered remain in the storage state of the pump head. In addition, the present invention relates to a metering device which can be configured for example as squeeze bottle, as non-airless system or as airless system, the metering device comprising a pump head according to the invention.

BACKGROUND

Metering systems, such as for example squeeze bottles, non-airless systems or airless systems, are known from the state of the art. These systems are distinguished by portion-wise metering of fluid to be dispensed or by continuous dispensing of fluid upon application of a corresponding pressure on the metering device. However, the problem remains still unresolved that, in the case of most systems, residues of liquids remain in the pump head after conclusion of the metering process. This is problematic in particular when the residual liquid can represent for example a breeding ground for bacteria or germs. The result hereby can be contamination of the entire contents of the metering system, as a result of which the contents become unusable. Likewise, it is problematic if remaining residues of a liquid to be metered, for example of a solution, remain in the pump head and dry up in there. Dissolved contents can then crystallise out for example, adhesion or crusting of moveable parts of the pump head can result, as a result of which the system becomes possibly inoperable.

SUMMARY/OVERVIEW

It is therefore the object of the present invention to indicate a pump head which does not have the above-mentioned disadvantages.

This object is achieved, with respect to a pump head, by the features of the metering device described in this disclosure.

The present invention hence relates to a pump head for a metering device for metered dispensing of a fluid, comprising a head part ("head base") with an outlet opening for the fluid to be dispensed, the head part having an inner surface, an elastic valve which has a geometric configuration corresponding to the inner surface of the head part, at least in regions, a first component 40 ("liner") which has a through-opening for the fluid to be dispensed, via which inflow of the fluid between head part and elastic valve is made possible with deformation of the elastic valve and with formation of an intermediate space between elastic valve and head part (actuation state (B)), head part and first component 40 being connected, in a form- and frictional fit, with inclusion of the elastic seal between head part and first component 40, and the elastic valve, in a storage state (A) of the pump head, being situated over the entire surface in a form-fit on the inner surface of the head part so that a fluidic seal between head part and first component 40 is ensured.

According to the present invention, the head part and also the elastic valve are hence coordinated to each other. The elastic valve thereby is situated on the inner surface of the head pump part so that complete closure of the outlet opening is ensured. Because of the fact that the elastic valve is configured elastically, at least in regions, the elastic valve is situated over the entire surface on the inner surface of the head part so that, in the storage state, no residual intermediate space between head part and elastic valve remains. All of the liquid to be metered is hence released out of the pump head via the outlet opening at the end of the metering process, i.e. when the pump head returns from an actuation state to a storage state.

The outlet opening can thereby be configured such that the fluid can be dispensed by means of the pump head in the form of drops or in the form of a spray mist.

A preferred embodiment provides that the elastic valve comprises a head and an elastic wall, the head having a geometric configuration corresponding to the inner surface of the head part and the elastic wall being configured deformably.

According to this preferred embodiment, in particular the wall of the elastic valve is configured elastically, whereas the head can be configured rigidly and hence is adapted directly to the nature of the inner surface of the head part. Hence, secure engagement of the head of the elastic valve in the inner surface of the head part in the region of the outlet opening is ensured.

It is hereby further preferred that the elastic wall has at least one predetermined bending point at which the elastic wall is bent outwards or inwards upon transference from the storage state (A) to the actuation state (B).

The wall of the elastic valve can be configured for example in the form of bellows. In the operating state, the wall of the elastic valve hence bends inwards at the predetermined bending points, whilst, in the storage state, stretching of the wall is effected so that the wall is likewise situated on the inner surface of the head part.

It is thereby particularly advantageous if the elastic wall is formed from a film of an elastically deformable material, in particular from a thermoplastic plastic material, rubber and/or silicone, preferably with a thickness of 0.03 to 1 mm, preferably 0.08 to 0.5 mm, particularly preferably 0.20 to 0.30 mm, and/or the head is configured solidly.

The head of the elastic valve can be configured preferably from the same material as the elastic wall. In particular, head and elastic wall are configured in one piece and are produced in particular simultaneously by an injection moulding method.

In a further advantageous embodiment, the elastic valve has at least one fixing element, via which the elastic valve is connected frictionally to at least one corresponding fixing element of the first component 40, the fixing element of the elastic valve and the fixing element of the first component 40 being configured preferably as catch connection or snap-on connection.

It is further preferred if the first component 40 has a wall which seals the intermediate space, a fluidic communication of the intermediate space with a region situated on the other side of the wall, viewed from the intermediate space, being made possible via the through-opening.

According to this embodiment, separate regions can be configured within the pump head, via which secure metering of the liquid is possible.

According to a further preferred embodiment, it is provided that the through-opening is guided from the region directly through the wall and opens into the region, or is guided, in the region, through a side wall of the first component 40, is guided on an outer surface of the first component 40 in a notch which can be delimited by the component, and is guided again, in the region, through the side well of the first component 40 and opens into the region.

In particular, the last-mentioned possibility, according to which a notch is provided in the outer surface of the component, makes possible a preferred guidance of the fluid in the intermediate space between the head part and the elastic valve.

It is thereby particularly preferred that, between elastic valve and first component 40, an element which exerts a restoring force on the elastic valve is disposed, the restoring force having the effect that the intermediate space configured in the actuation state (B) is closed upon return into the storage state (A). The element is in particular a spring.

It is thereby further advantageous that the first component 40 is connected, at its end orientated away from the elastic seal, to a (second) component 60, via which the pump head (I) can be connected to a storage vessel (II) for storing the fluid to be dispensed.

It is hereby of advantage in particular if, between the first component 40 and the second component 60, at least one means for sterile filtration of incoming air is present (non-airless system), in particular a bacteria filter, or the first component 40 is configured to be hermetically sealing relative to the second component 60 (airless system).

The pump head configured for non-airless systems can thereby be used in particular in the case of squeeze bottles or corresponding metering devices with pump head.

In the case of squeeze bottles, a passive actuation of the pump head thereby takes place since the fluidic pressure is effected by actuation of the squeeze bottle connected to the pump head.

The first component 40 can hereby be fixed relative to the second component 60. This embodiment is advantageous in particular for metering devices which comprise a squeeze bottle.

In the case of metering systems in which pressure is formed by actuation of the pump head itself, an active actuation of the pump head takes place. Such pump heads can be configured both for airless- and for non-airless metering systems.

In the case of such systems, it is preferred if the first component 40 is configured moveably relative to the second component 60, at least one means which exerts a restoring force on the first component 40 being disposed between the first component 40 and the second component 60, the component preferably being a spring.

This embodiment is advantageous in particular for pump heads to be operated actively, a pressure can hereby be exerted on the fluid to be metered by moving the separate first and second components 40 and 60.

It is hereby further advantageous that the second component 60 has a recess which preferably has a cylindrical configuration in which a hollow piston with a through-channel is guided moveably.

It can be provided in this embodiment that the second component 60 has a wall configured to form a seal relative to the first component 40 and has a through-opening which is closeable with a moveable hollow piston, a region or intermediate space which is in fluidic communication with the through-opening between first component 40 and second component 60 being configured through the wall, or being configured open relative to the first component 40, the hollow piston being disposed in the second component 60 such that the through-opening is not closed by the hollow piston.

The hollow piston, at its end orientated away from the first component 40, can be guided moveably into a pump housing which has a pump volume defined by the pump housing and hollow piston, the pump volume being maximised in the storage state (A) and minimised in the actuation state (B).

A further preferable embodiment provides that the pump housing comprises a base-side inlet which is closeable preferably by means of a valve, in particular a disk valve or ball valve, during the actuation process and can be opened upon transference of the pump head from the actuation state (B) to the storage state (A). Such an embodiment is preferred in particular in the case of actively actuatable airless- and/or non-airless pump heads.

Upon transference of the pump head from the actuation state to the storage state, liquid stored hereby in a storage vessel flows again by opening the valve into the pump housing.

At the base-side inlet of the pump housing, in addition a riser pipe can be disposed. This embodiment is advantageous in particular in the case of non-airless systems with an actively actuatable pump head. In the case where of concern is an airless system, a riser pipe is possibly not necessary in the case of actively operable pump heads.

A further preferred variant of the pump head provides that, when connecting the pump head (I) via the second component 60 to the storage vessel (II), a seal is disposed between second component 60 and the storage vessel (II), or via the pump chamber to the storage vessel (II), a seal is disposed between pump chamber and the storage vessel (II).

Preferably, the head part can comprise an anti-bacterial material, preferably metals or metal ions, in particular silver particles or silver ions. In particular, the head part can be producible in the injection moulding method, for example an anti-bacterial material can be compounded directly with the thermoplastic material which is used for producing the injection moulded part.

The invention relates in addition to a metering device which comprises a pump head as described above. The pump head is thereby connected to a storage vessel.

Preferably, the storage vessel can be configured as squeeze bottle or as rigid container.

Likewise, it is possible that the storage vessel (II) comprises an inner bag which is sealed hermetically relative to the pump head (I), the inner bag being configured in particular as bellows.

This embodiment is suitable in particular for airless systems.

The metering device according to the present invention is suitable for storing both fluids or solutions comprising preservatives, in particular however for storing preservative-free fluids or solutions.

The present invention is described in more detail with reference to the annexed Figures without restricting the invention to the specially illustrated embodiments.

DETAILED DESCRIPTION

Figure 1:
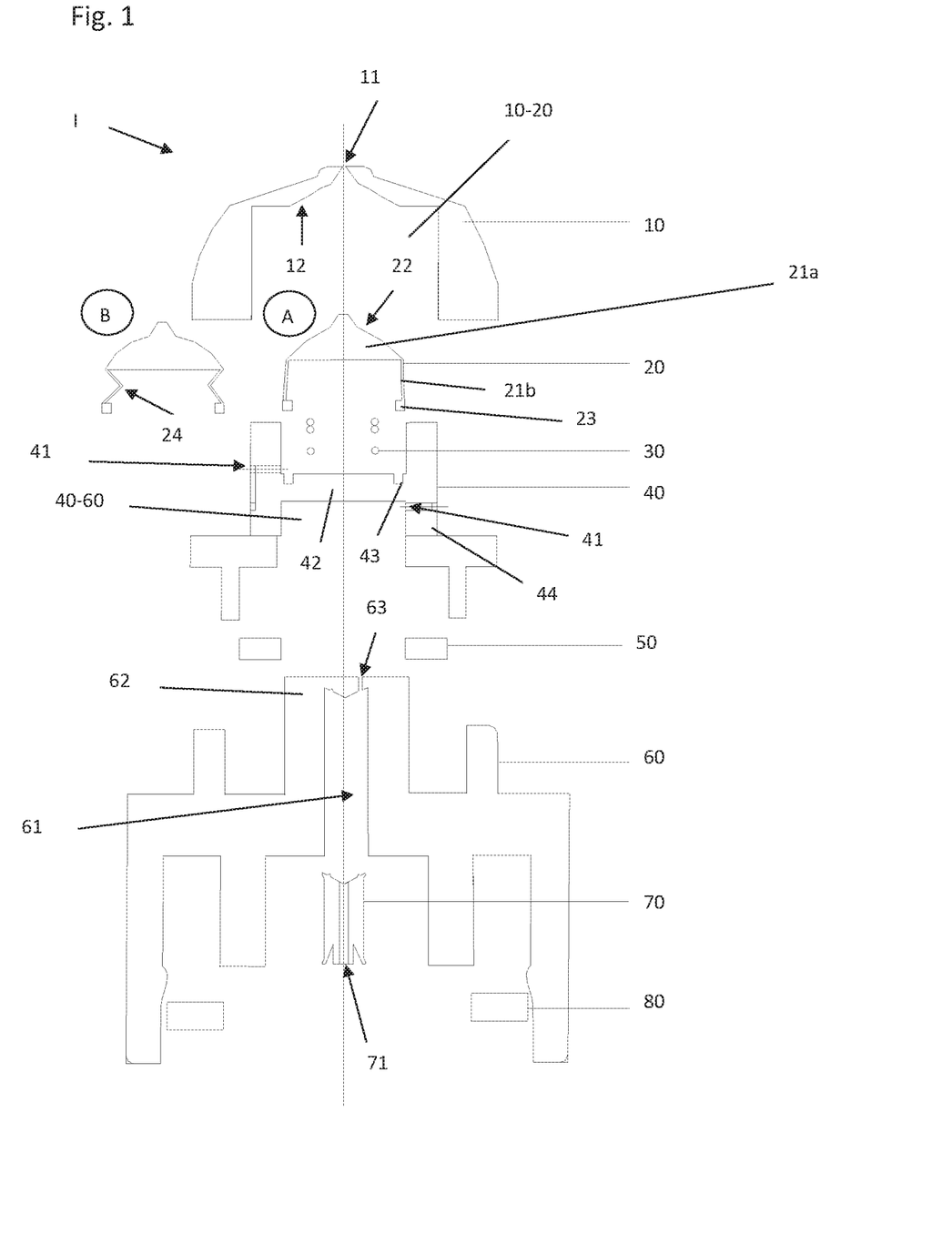
FIG. 1 illustrates an example pump head suitable as a metering head for a squeeze bottle.

FIG. 1 shows a pump head I which is suitable in particular as metering head for a squeeze bottle. The pump head I thereby comprises a head part 10 with an outlet opening 11 which can be configured preferably for drop-like dispensing of fluids. Likewise, it is however possible to configure the outlet opening such that a spray mist is producible in the dispensing of the fluid. The head part 10 thereby sits directly on a component 40 and is connected to the latter in a form- and frictional fit. The head part 10 thereby has an inner recess which has an inner surface 12. An elastic valve 20 which has a head 21a and an elastic wall 21b is disposed between head part 10 and component 40. The valve 20 is illustrated in a storage state (A) and in an actuation state (B). It is detectable that, in the actuation state (B), the elastic wall 21b bends inwards, for this purpose the elastic wall 21b preferably comprises a predetermined bending point 24 which is evident in the actuation state (B). In the storage state (A), the predetermined bending points 24 are smoothed out. The head 21a of the valve 20 can thereby be configured solidly, the elastic wall 21b can be added as hose-like wall to the head 21a. The completely elastic valve 20 can be produced in one piece in the injection moulding method. On the elastic wall 21b, fixing elements 23, for example a circumferential spring, are present. The elastic valve 20 is fixed on the body 40 via the fixing elements 23. For this purpose, the fixing elements 23 are caught in corresponding fixing elements 43, for example a circumferential groove, of the body 40, The surface 22 of the head 21a of the valve 20 thereby has an identical configuration to the inner surface 12 of the head part 10 so that the head 21a of the valve 20 can engage in the head part 10 in a form-fit in the storage state (A) and hence closes the outlet opening 11 completely. As a result, the intermediate space 10-20 configured in the actuation state (B) between head part 10 and elastic valve 20 is completely closed, all the fluid which is present in the actuation state between head part 10 and elastic valve 20 in the intermediate space 10-20 is discharged out of the outlet opening 11 upon transference of the pump head into the storage state. The component 40 has a wall 42 which separates constructionally the pump head into an upper part (the part which comprises the head part and the elastic valve 20) and a lower part (below the wall 42). Below the wall 42 of the component 40, a component 60 which is connectable in a form-fit to the component 40 is inserted. An intermediate space 40-60 results between component 60 and component 40. The component 40 thereby has a through-opening 41 which is configured, in the case illustrated in FIG. 1, by way of example, such that, in the lower part of the component 40 (at the top of the intermediate space 40-60), the through-opening 41 is led through the wall 44 of the component 40 and is guided there around the component 40 in a (not illustrated) notch on the outer surface of the component 40. The notch thereby communicates with an upwards leading channel which is illustrated on the left in FIG. 1 and opens into a further through-opening 41, through which the fluid can be guided into the intermediate space 10-20 between valve 20 and head part 10. The channel guided on the surface of the component 40 is thereby delimited and sealed by the component 40 placed thereon.

The component 60 has a wall 62 which is fitted on the head-side and into which an eccentric through-opening 63 is introduced. The component 60 is thereby inserted into the component 40 until the wall 62 does not form a seal directly with the wall 42 of the component 40 but an intermediate region 40-60 remains and hence the through-opening 41 which is disposed in the lower part of the component 40 remains opened. In the case of the pump head I according to FIG. 1, by way of example, a bacteria-filtering material 50 is fitted between component 40 and component 60, via which material an air exchange of the internal region of the pump head with the surroundings is possible. The component 60 has a recess 61 into which a hollow piston 70 with an inner hollow volume 71 is introduced. The hollow piston 70 is thereby disposed moveably in the recess 61 in the axial direction (at the top and bottom in FIG. 1). In addition, the pump head can have a sealing element 80 via which a sealing fitting of the pump head I on a storage vessel II, not illustrated in FIG. 1, is possible.

Figure 2:
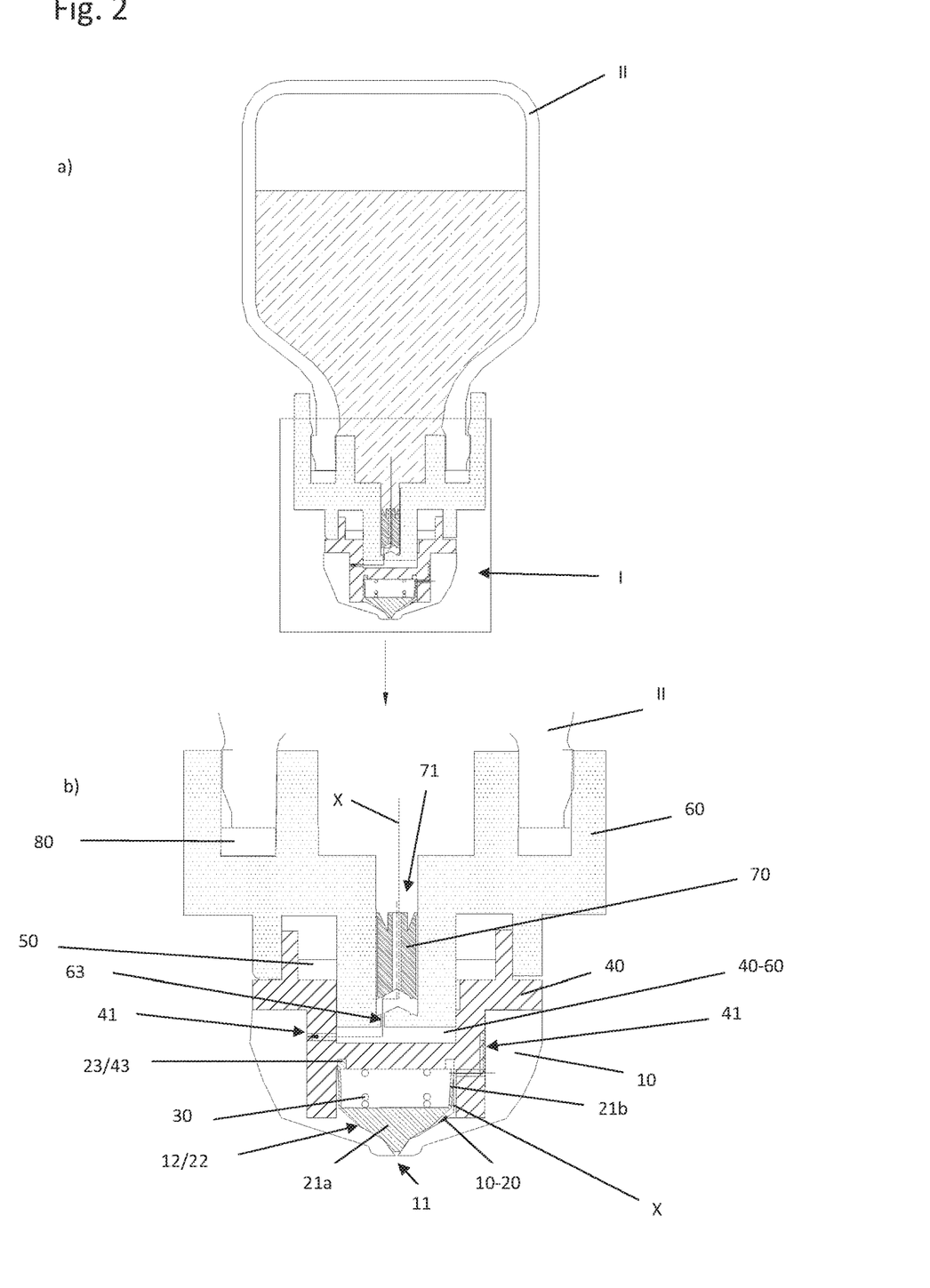
FIG. 2 illustrates am example of a pump head on a storage vessel.

FIG. 2 shows a pump head I according to FIG. 1 which is illustrated on a storage vessel II, in the case of FIG. 2 on a squeeze bottle. The storage vessel II thereby contains a fluid to be dispensed, which is illustrated hatched in FIG. 2a in the storage vessel II. FIG. 2a shows a section through the entire arrangement in the state of use, FIG. 2b the detail of the pump head I boxed-in in FIG. 2a. The same reference numbers, as illustrated in FIG. 1, were hereby used. In FIG. 2b, the route of the fluid out of the storage vessel II in the direction of the outlet opening 11 is indicated with the arrow X, through the through-channel 71 of the hollow piston 70, through the intermediate region 40-60 between component 60 and component 40, through the through-opening 41, through the intermediate space 10-20 which is produced during actuation of the metering device according to FIG. 2 and finally in the direction of the outlet opening 11.

Figure 3:
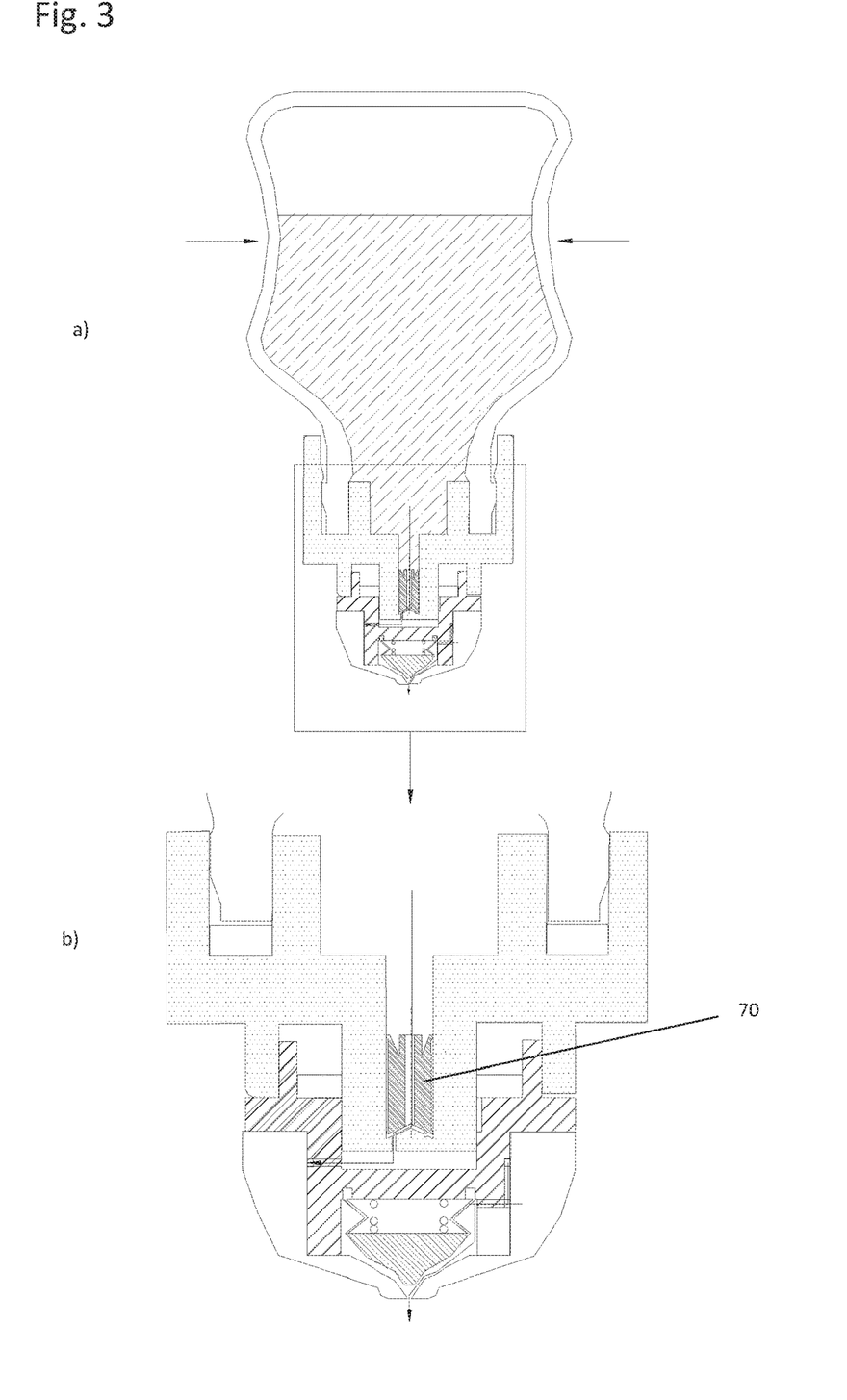
FIG. 3 illustrates a metering device according to FIG. 2 during application of pressure on the storage vessel.

FIG. 3 shows the same metering device according to FIG. 2, during application of a pressure (indicated by the arrows in FIG. 3a) on the squeeze bottle II. The hollow piston 70 (see FIG. 3b) is hereby pressed downwards (indicated by the arrow on the left next to the hollow piston 70) and hence the fluid situated below the hollow piston 70 and enclosed by the hollow piston 70 and the component 60 is pressed through the through-opening 43 of the component 60 into the intermediate space 40-60. In FIG. 3, with the exception of the reference number 70, no further reference numbers are inserted for reasons of clarity. The fluid 41 is pressed via the through-opening 41 further into the intermediate space 10-20 between elastic valve 20 and head part 10 of the pump head I. A deformation of the elastic valve hereby takes place, which, as shown in FIG. 3b, bends outwards and hence uncovers the outlet opening 11, as a result of which the fluid can emerge. Because of the fact that the through-channel 71 of the hollow piston 70 and the through-opening 63 of the component 60 are not disposed congruently, closure of the through-opening 63 takes place when the hollow piston 70 abuts against the wall 62 of the component 60. Hence, even with further application of pressure, no further discharge of a fluid out of the metering device is possible since the through-channel 63 is closed. With this pump head I, a metered dispensing of fluid out of a squeeze bottle is hence possible. The state illustrated in FIG. 3b corresponds to the actuation state (B) of the pump head.

Figure 4:
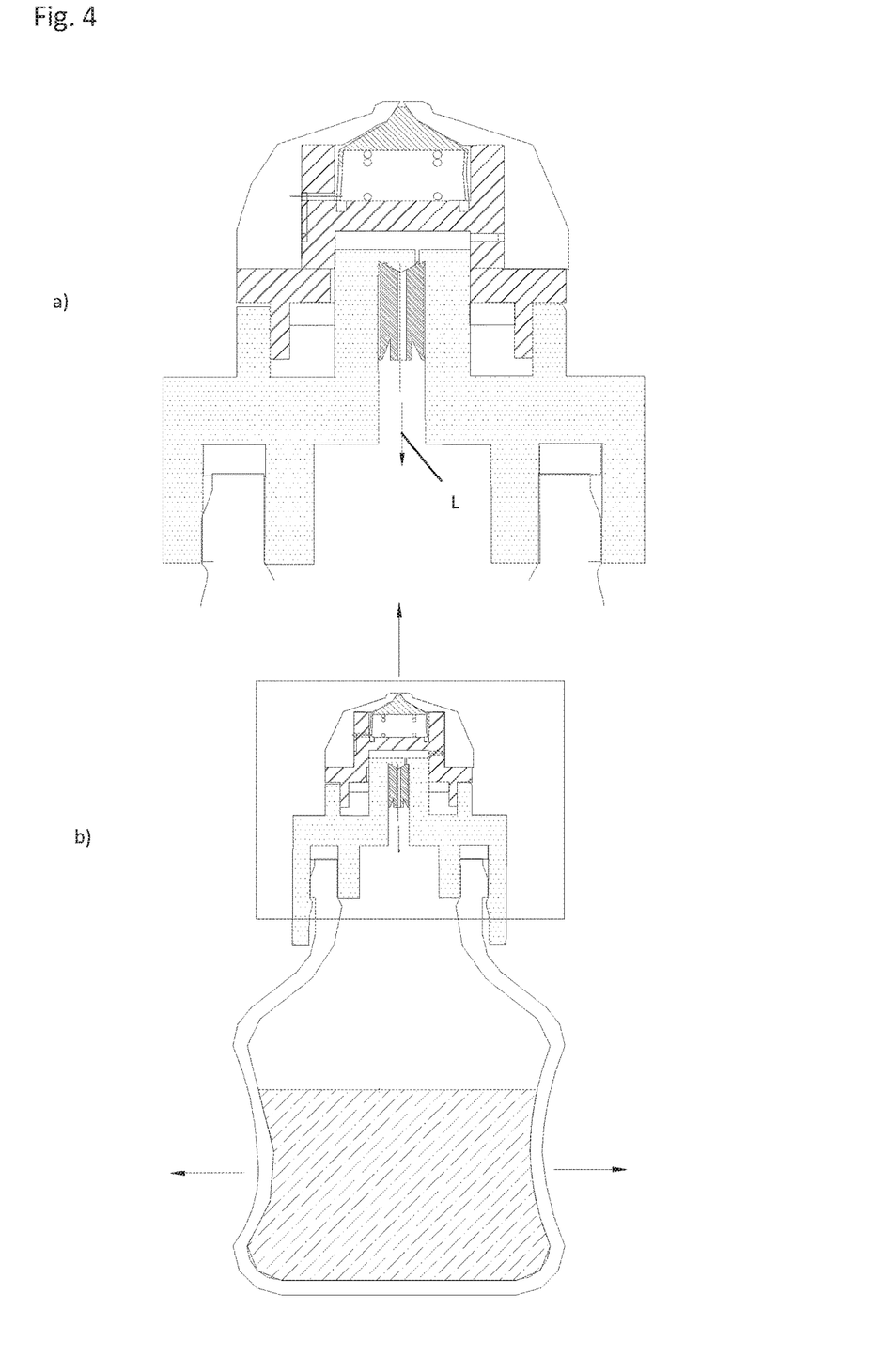
FIG. 4 illustrates an example in which transference of the metering device from the actuation to the storage state is effected.

FIG. 4 shows an embodiment in which transference of the metering device, in particular of the pump head, from the actuation to the storage state is effected. For reasons of clarity, no reference numbers are illustrated, however the same explanations as in the case of the preceding Figures apply. FIG. 4a thereby represents an enlarged detail of the metering device illustrated in FIG. 4b. As is evident from FIG. 4a, the hollow piston 70 is still in the end position which is reached during the actuation process, as illustrated in FIG. 3. At the end of the actuation process, the metering device can be transferred by the user into the storage position, the metering device, in the case of the Figure, a squeeze bottle, being placed on the head. The user hereby releases the squeeze bottle, because of the restoring force of the squeeze bottle, the latter resumes its original shape, as illustrated in FIG. 2. The restoring force is illustrated in FIG. 4b by the arrows pointing outwards. Because of the removed volume of fluid, a low pressure is produced in the storage vessel II during this process and continues over the hollow piston 70 into the pump head I of the metering device. For pressure equalisation, air is suctioned into the storage vessel 2 via a sterile filter. During this process, also the hollow piston 70 is moved back into its initial position, i.e. in the case illustrated in FIG. 4, the hollow piston 70 is moved downwards. Via the bacteria filter 50 which can be present for example between component 60 and component 40, an air inlet (arrow L) into the interior of the storage vessel II, i.e. the squeeze bottle, is possible.

Figure 5:
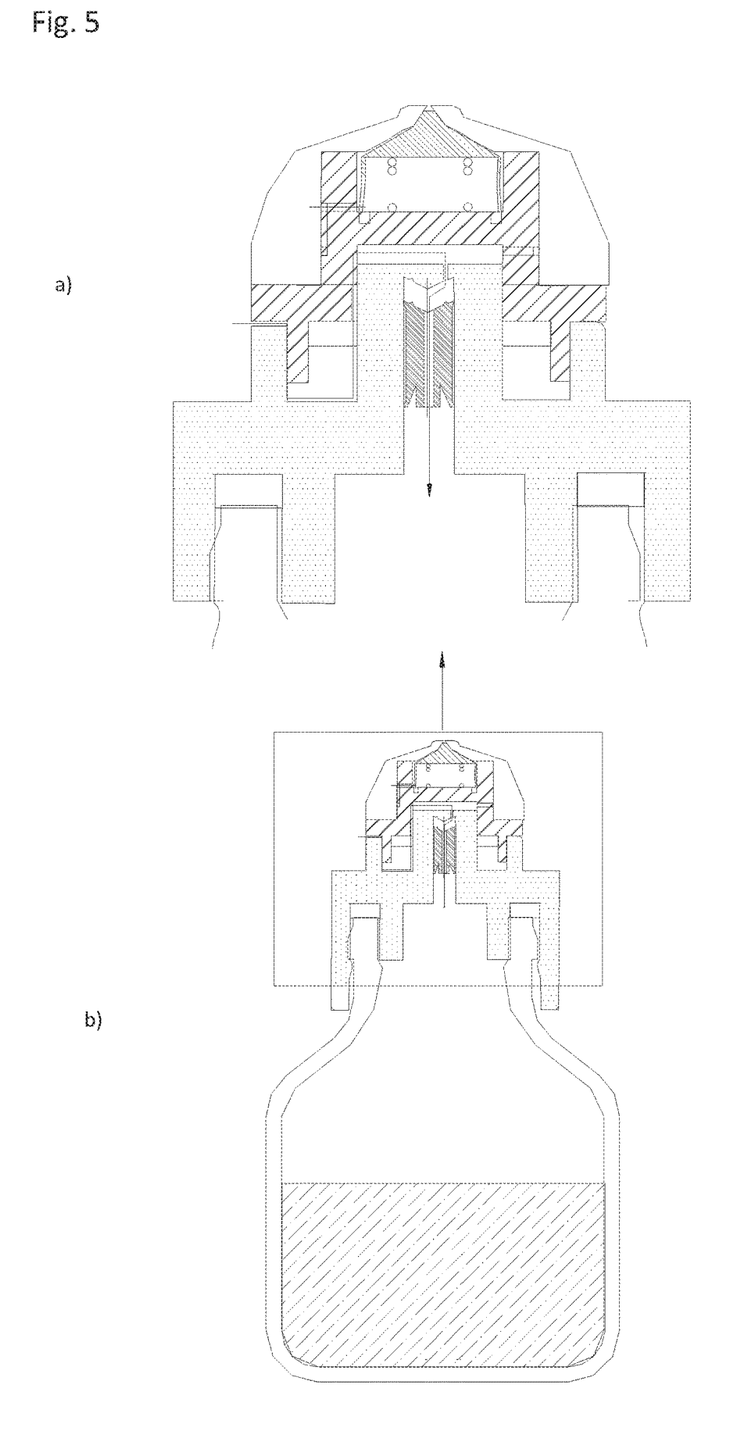
FIG. 5 illustrates an example of the storage position of the bottle in which a hollow piston is illustrated in its end position and the squeeze bottle is relaxed.

FIG. 5 shows the storage position (A) of the bottle in which the hollow piston 70 is illustrated in its end position and the squeeze bottle II is completely relaxed (see FIG. 5b).

Figure 6:
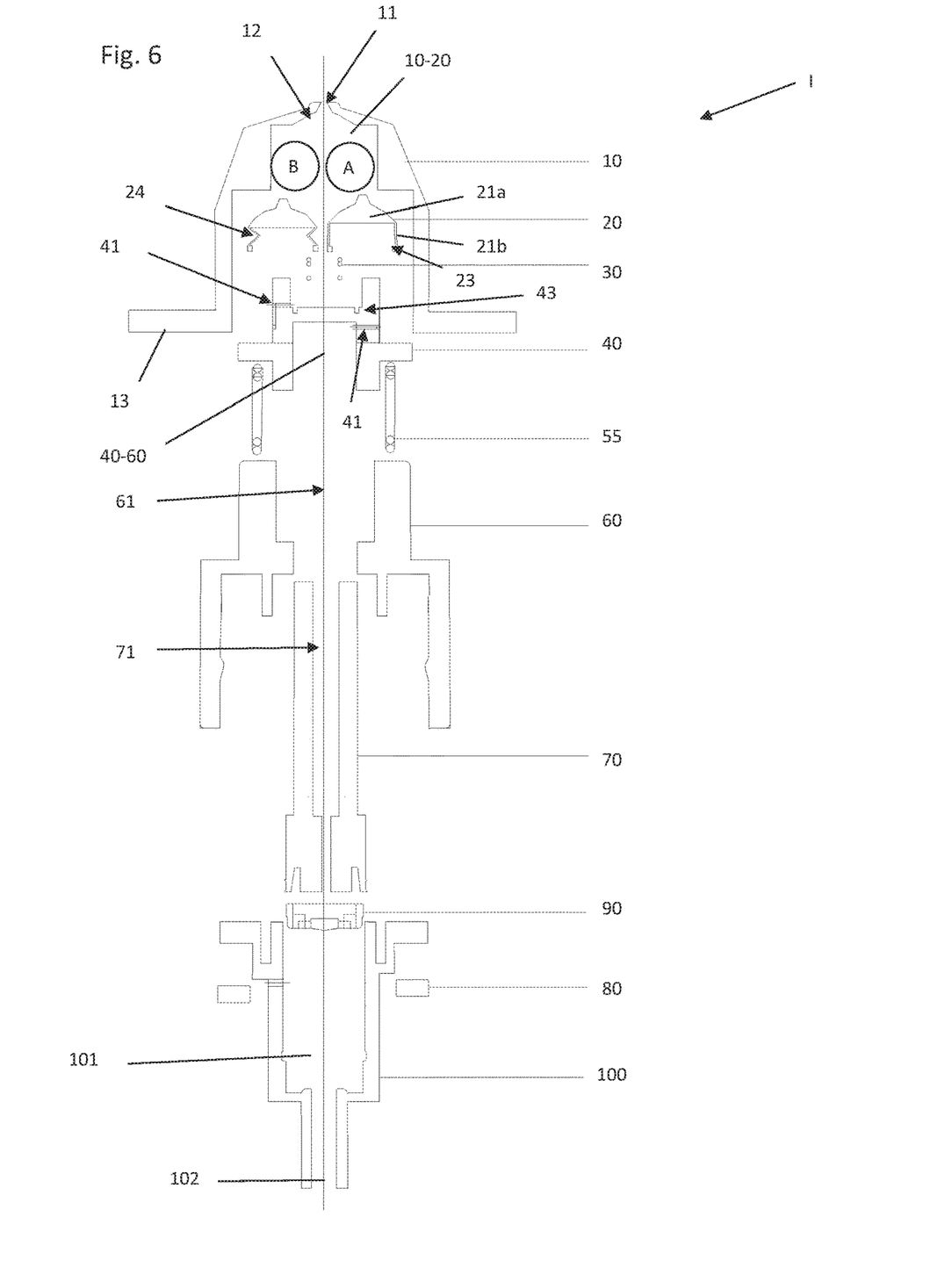
FIG. 6 illustrates an alternate example of a pump head.

FIG. 6 shows a further embodiment of a pump head according to the invention, the components 10, 20, 30 and 40 being configured essentially the same constructionally as the corresponding components according to FIG. 1. The corresponding reference numbers thereby denote identical components. The most essential difference of the pump head I according to FIG. 6 from the pump head I according to FIG. 1 is thereby that the pump head I is actuatable actively according to FIG. 6, i.e. the components 40 and 60 are not connected together rigidly but are configured moveably relative to each other via a spring element 55. For implementing this movement, the head part 10 thereby comprises in addition a handle 13, via which a user can exert pressure on the head part and hence can press the components 10 to 40 in the direction of the component 60. In contrast to the embodiment according to FIG. 1, the component 60 is thereby configured open, i.e. has no upwardly sealing wall 62. A hollow piston 70 which has a through-channel 71 is guided through the recess 61 of the component 60. The hollow piston, for its part, opens into a pump housing 100 which has a pump volume 101 and an inlet opening 102. On the base-side at the inlet opening, a valve 90, for example a disc valve, is disposed. The particular feature of the pump head I according to FIG. 6 resides in addition in the fact that in particular the components 10, 40 and 60 are hermetically sealed relative to each other so that no exchange of air of the inner volumes of the pump head I with the surroundings is possible. The pump head I according to FIG. 6 hence concerns an airless pump head.

Figure 7:
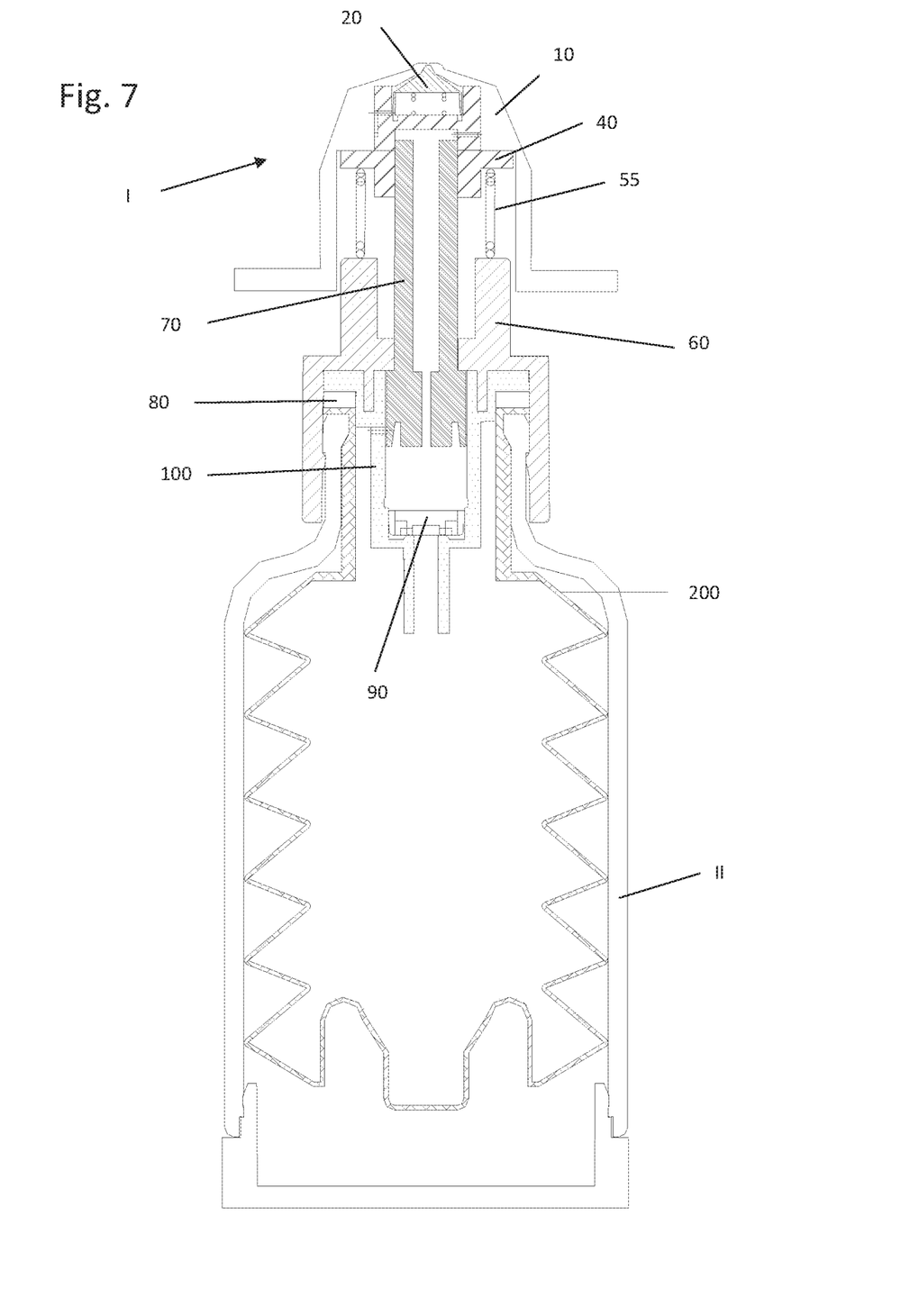
FIG. 7 illustrates an example of an application case of the pump head of FIG. 6.

FIG. 7 shows an application case of a pump head illustrated in FIG. 6. For simplification, merely the individual components are characterised with reference numbers, however the same embodiments according to FIG. 6 apply.

If a user actuates the pump head I in a metering device according to FIG. 7 via the handle 13, then also the hollow piston 70 which is fixed relative to the component 40 is pressed together with the head part 10 downwards into the pump housing 100. During this pumping process, the valve 90 remains closed so that the result is a reduction in the pump volume 101. The fluid situated in the volume 101 is consequently pressed upwards through the through-channel 71 of the hollow piston 70 and, corresponding to the principles explained already in the case of FIG. 1, is discharged through the through-opening 41 of the component 40 and the forming intermediate space 10-20 between valve 20 and head part 10 via the outlet opening 11. The storage vessel II is configured as a rigid container in this case, in which for example also bellows 200 can be inserted.

Figure 8:
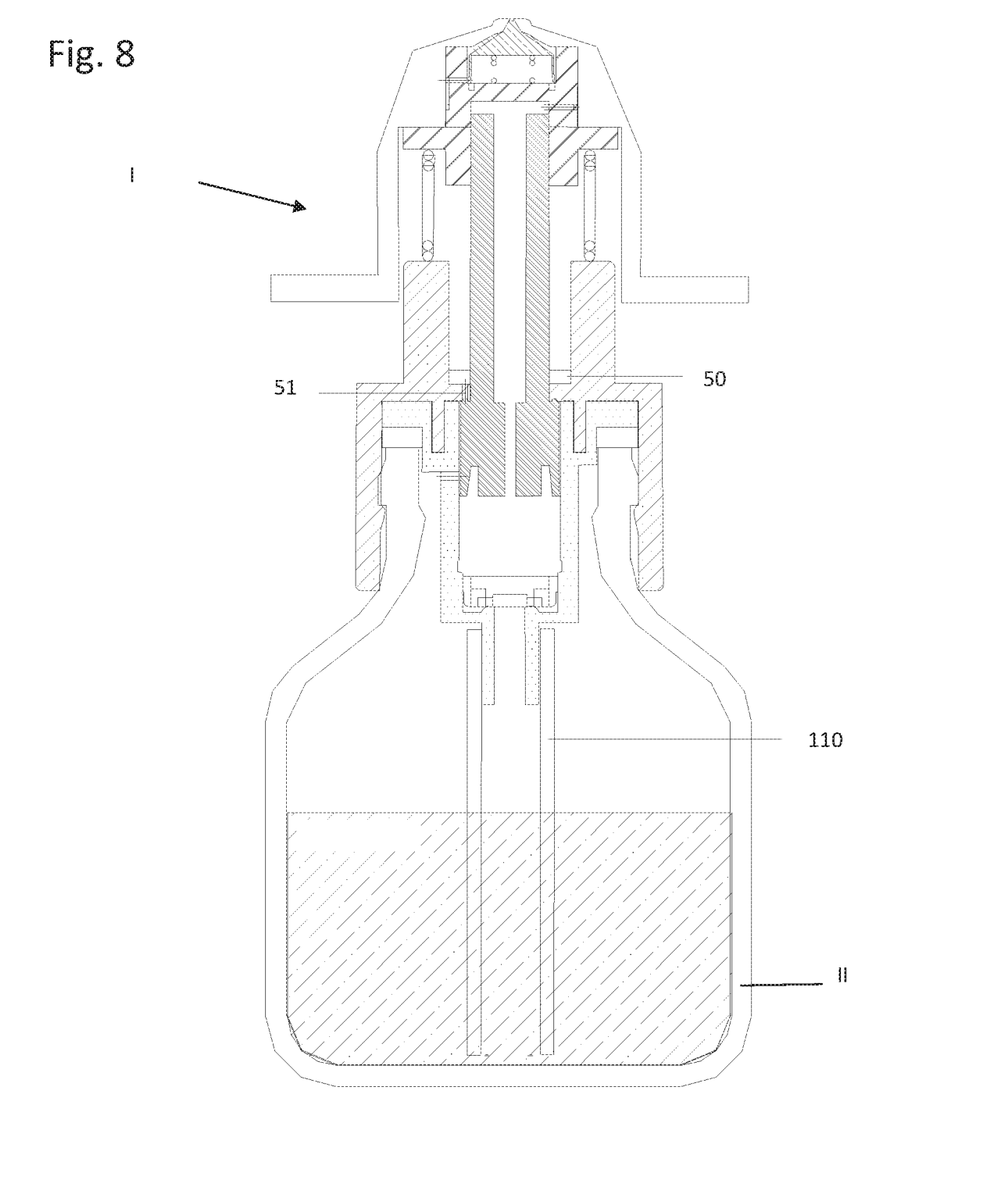
FIG. 8 illustrates an example of the pump head of FIG. 6 in a non-airless system.

FIG. 8 shows a variant of the pump head according to FIG. 6 in a non-airless system. Identical references to those illustrated in FIG. 6 apply, merely components which differ constructionally are indicated with separate reference numbers. In contrast to the pump head I according to FIG. 6, the components 40 and 60 are not hereby sealed hermetically relative to each other, but rather a bacteria filter 50 is incorporated between pump parts 40 and 60. In the component 60, in addition, a through-channel 51 for air is present, as a result of which surrounding air can enter into interior of the metering device via the through-channel 51. The through-channel 51 is thereby opened in the actuation state and is closed by the hollow piston 70 in the storage state. Actuation of the pump head from the storage state into the operating state is effected according to the explanations relating to FIG. 7. The contents solution stored in the storage vessel II is thereby suctioned into the pump chamber by means of a riser pipe 110.

Figure 9:
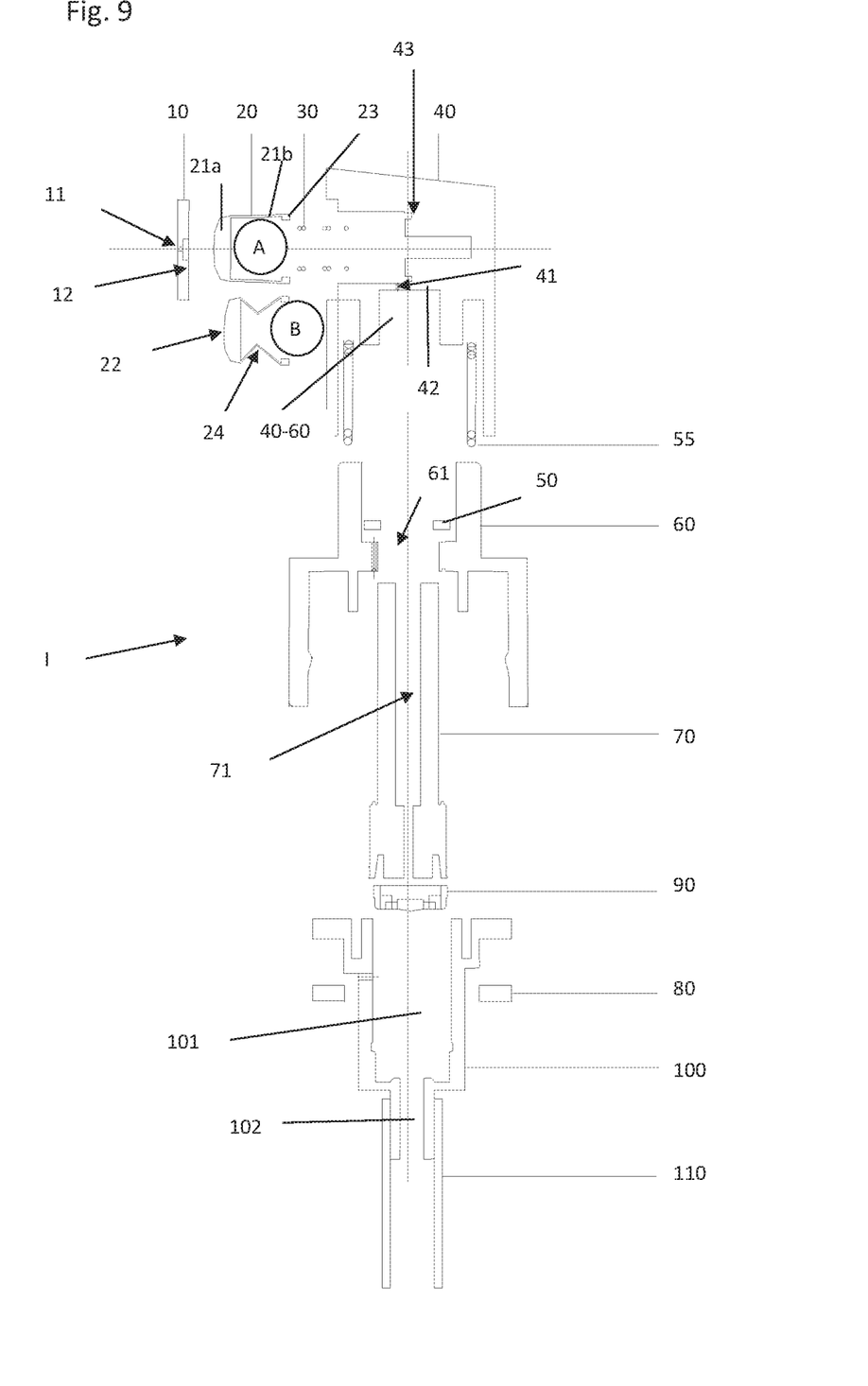
FIG. 9 illustrates an example of a pump head configured for the lateral dispensing of fluids.

FIG. 9 shows a further variant of a pump head I according to the invention, which is configured in the case illustrated in FIG. 9 for lateral dispensing of fluids. The pump head I is hereby configured in particular as spray head, i.e. the outlet opening 11 comprises means for producing a spray mist of a fluid to be dispensed. The head part 10 is hereby configured as insert in component 40. In the intermediate space between component 40 and component 10, the valve 20 which is configured identically is disposed as in the case of FIG. 1, given by way of example. Likewise the operating states (A) and (B) of the valve 20 which otherwise function identically, as described in FIG. 1, are illustrated. The pump head I according to FIG. 1 is thereby configured as non-airless pump head, i.e. the components 40 and 60 are configured moveably relative to each other, however not hermetically sealing. Hence a bacteria filter 50 for filtration of incoming air is present between components 40 and 60. Component 40 has a through-opening which leads directly from the intermediate space 40-60 into the intermediate space 10-20 between valve 20 and head part 10. The mode of operation of the remaining components 70-110 was already explained in detail with reference to FIGS. 6 to 8 and is also identical in the case of FIG. 9.

Figure 10:
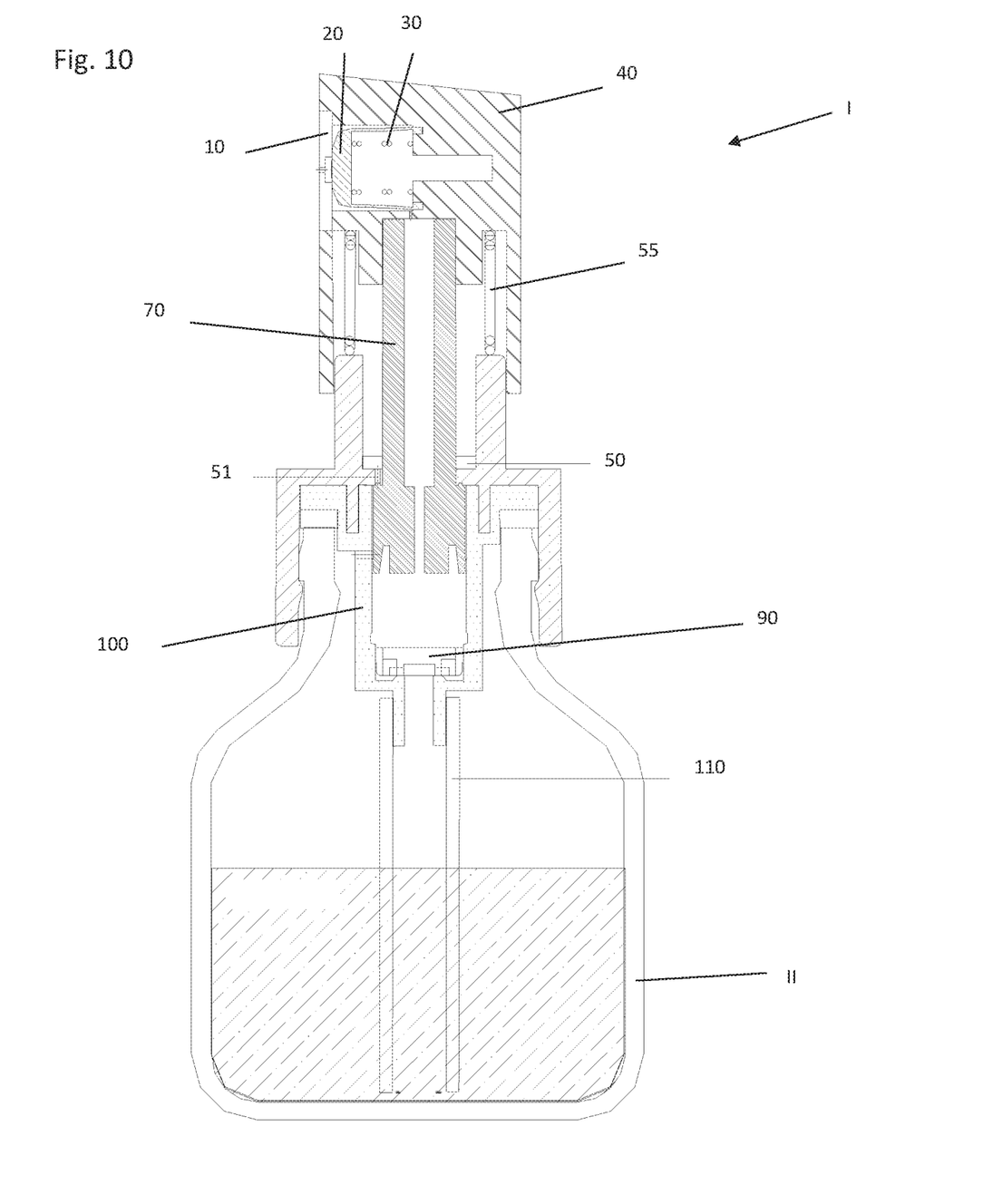
FIG. 10 illustrates an example of the pump head of FIG. 9 incorporated into a non-airless system.

FIG. 10 shows the incorporation of the pump head I according to the invention according to FIG. 9 in a non-airless system. The mode of operation thereby corresponds to the mode of operation illustrated in FIG. 8.

Figure 11:
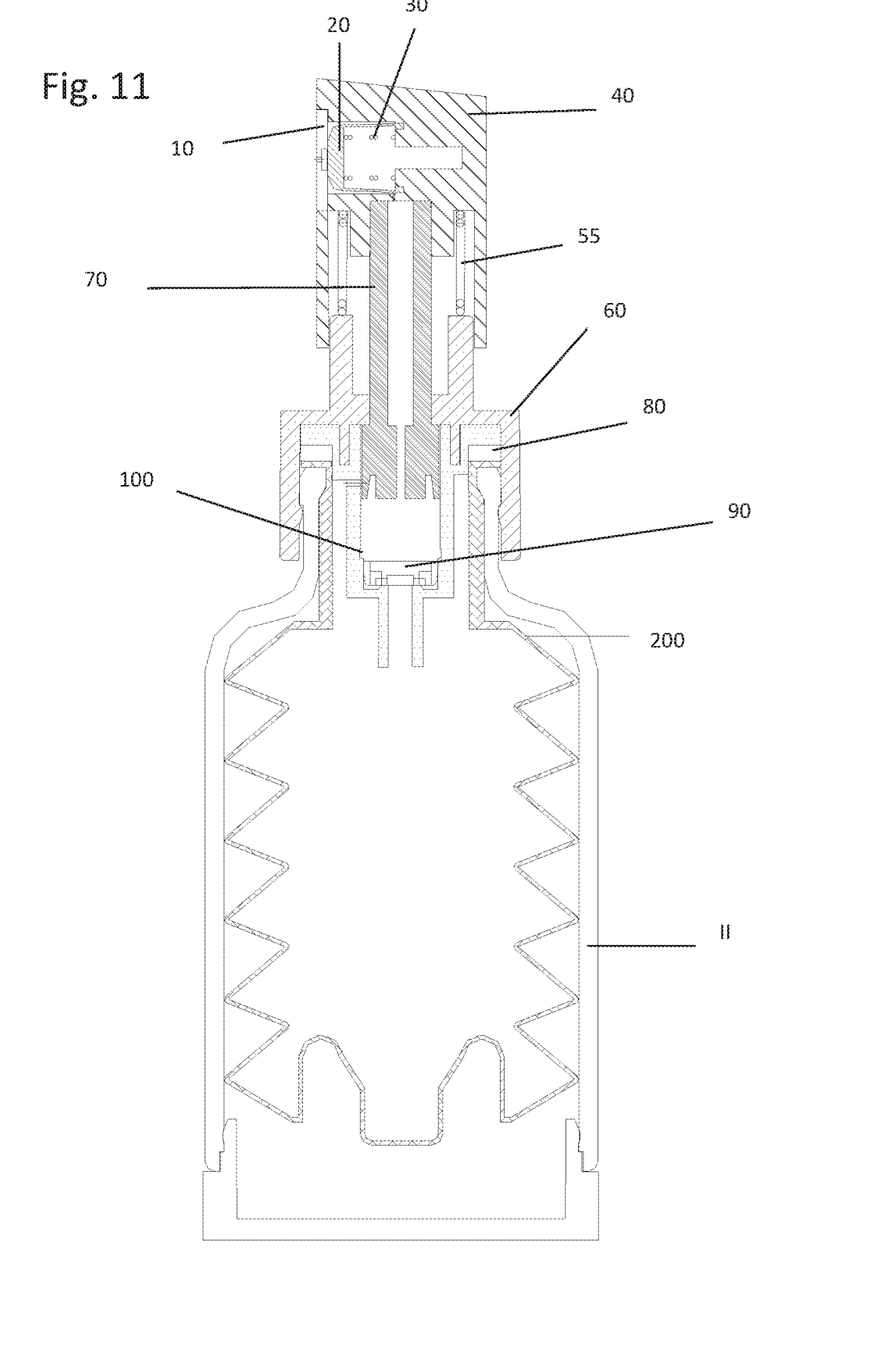
FIG. 11 illustrates an example of the pump head of FIG. 9 as an airless pump head.

FIG. 11 shows a variant of the pump head I according to the invention according to FIG. 9 as airless pump head. No bacteria filter 50 is hereby present between the components 40 and 60, the components 40 and 60 are thereby mounted one above the other hermetically sealing so that no air entry from the surroundings into the interior of the pump head or into the storage vessel II can take place. The mode of operation of the metering device is otherwise identical to the mode of operation illustrated in FIG. 7.

The invention claimed is:

1. A pump head for a metering device for metered dispensing of a fluid, comprising:
   a head part with an outlet opening for the fluid to be dispensed, the head part having an inner surface,
   an elastic valve which has at least in regions a geometric configuration corresponding to the inner surface of the head part,
   a liner which has a through-opening for the fluid to be dispensed, via which an inflow of the fluid between the head part and the elastic valve is enabled with deformation of the elastic valve and with formation of an intermediate space between the elastic valve and the head part in an actuation state,
   wherein the head part and the liner are connected in a frictional fit, with inclusion of the elastic valve between the head part and the liner, and
   the elastic valve, in a storage state of the pump head, is situated over an entire surface in a form-fit on the inner surface of the head part so that a fluidic seal between the head part and the liner is ensured.

2. The pump head according to claim 1, wherein the elastic valve has at least one fixing element, via which the elastic valve is connected frictionally to at least one corresponding fixing element of the liner, and wherein the at least one fixing element of the elastic valve and the at least one corresponding fixing element of the liner are connectable as at least one of: a catch connection or a snap-on connection.

3. The pump head according to claim 1, wherein the liner has a wall which seals the intermediate space, a fluidic communication of the intermediate space with a region situated on the other side of the wall, viewed from the intermediate space, being made possible via the through-opening.

4. The pump head according to claim 1, wherein the through-opening is guided from a region in between the liner and a component
   directly through the wall and opens into the region, or
   is guided, in the region, through a side wall of the liner, is guided on an outer surface of the liner in a notch, and is guided again, in the region, through the side wall of the liner and opens into the region.

5. The pump head according to claim 1, wherein, between elastic valve and the liner, an elastic element which exerts a restoring force on the elastic valve is disposed, the restoring force having the effect that the intermediate space configured in the actuation state is closed upon return into the storage state.

6. The pump head according to claim 1, wherein an end of the liner, which is orientated away from an elastic seal, is connected to a component, via which the pump head can be connected to a storage vessel for storing the fluid to be dispensed.

7. The pump head according to claim 6, wherein the liner is fixed relative to the component or is configured moveably, at least one spring means which exerts a restoring force on the liner being disposed between the liner and the component.

8. The pump head according to claim 6, wherein, when connecting the pump head via the component to the storage vessel, a seal is disposed between component and the storage vessel, or
   via the pump chamber to the storage vessel, a seal is disposed between pump chamber and the storage vessel.

9. The pump head according to claim 1, wherein the head part includes an anti-bacterial material.

10. The pump head according to claim 6 wherein, between the liner and the component, at least one means for sterile filtration of incoming air is present, or the liner is configured to be hermetically sealing relative to the component.

11. The pump head of claim 10, wherein the at least one means for sterile filtration of incoming air is a bacteria filter.

12. The pump head according to claim 1, wherein the elastic valve comprises a head and an elastic wall, the head having a geometric configuration corresponding to the inner surface of the head part and the elastic wall being configured deformably.

13. The pump head according claim 12, wherein the elastic wall has at least one predetermined bending point at which the elastic wall is bent outwards or inwards upon transference from the storage state to the actuation state.

14. The pump head according to claim 12, wherein the head and the elastic wall are configured in one injection molded piece.

15. The pump head according to claim 12, wherein the elastic wall is formed from a film of an elastically deformable material or the head is a solid mass.

16. The pump head of claim 15, wherein the elastically deformable material includes at least one of: a thermoplastic plastic material, rubber, or silicone, with a thickness of 0.03 to 1 mm, inclusive.

17. The pump head according to claim 6, wherein the component has a recess which preferably is configured cylindrically and in which a hollow piston with a through-channel can be guided moveably.

18. The pump head according to claim 6, wherein the component
   has a wall configured to form a seal relative to the liner and has a through-opening which is closeable with a moveable hollow piston, a region or intermediate space which is in fluidic communication with the through-opening between the liner and the component being configured through the wall, or
   being configured open relative to the liner, the hollow piston being disposed in the component such that the through-opening is not closed by the hollow piston.

19. The pump head according to claim 17, wherein the hollow piston, at its end orientated away from the liner, is guided moveably into a pump housing which has a pump volume defined by the pump housing and hollow piston, the pump volume being maximized in the storage state and minimized in the actuation state.

20. The pump head according to claim 19, wherein the pump housing comprises a base-side inlet which is closeable by a valve during the actuation process and can be opened upon transference of the pump head from the actuation state to the storage state.

21. The pump head according to claim 20, wherein, at the base-side inlet, a riser pipe is disposed.

22. The pump head of claim 20, wherein the valve is at least one of: a disc valve or ball valve.

23. A Metering device, comprising:

A pump head for metered dispensing of a fluid connected to a storage vessel, the pump head comprising:

a head part with an outlet opening for the fluid to be dispensed, the head part having an inner surface;

an elastic valve which has at least in regions a geometric configuration corresponding to the inner surface of the head part;

a liner which has a through-opening for the fluid to be dispensed, via which an inflow of the fluid between the head part and the elastic valve is enabled with deformation of the elastic valve and with formation of an intermediate space between the elastic valve and the head part in an actuation state;

wherein the head part and the liner are connected in a frictional fit, with inclusion of the elastic valve between the head part and the liner; and the elastic valve, in a storage state of the pump head, is situated over an entire surface in a form-fit on the inner surface of the head part so that a fluidic seal between the head part and the liner is ensured.

24. The metering device of claim 23, wherein the storage vessel is at least one of: a squeeze bottle or a rigid container.

25. The metering device of claim 23, wherein the storage vessel includes an inner bag which is sealed hermetically relative to the pump head, and wherein the inner bag is configured as a bellows.

* * * * *